United States Patent Office 3,634,477
Patented Jan. 11, 1972

3,634,477
ZIRCONIUM TETRAKIS (HEXAFLUOROACETYL-ACETONATE) AND HAFNIUM TETRAKIS (HEXAFLUOROACETYLACETONATE)
Shib C. Chattoraj, 1350 Redbud Drive, and Charles T. Lynch, 387 Cherrywood Drive, both of Fairborn, Ohio 45324, and Khodabakhsh Mazdiyasni, 2218 Upper Bellbrook Road, Xenia, Ohio 45385
No Drawing. Filed May 8, 1969, Ser. No. 823,152
Int. Cl. C07f 7/00
U.S. Cl. 260—429.3
2 Claims

ABSTRACT OF THE DISCLOSURE

The preparation, characterization, and thermal decomposition of zirconium tetrakis (hexafluoroacetylacetonate) and hafnium tetrakis (hexafluoroacetylacetonate) are described. The compounds are prepared by the reaction of zirconium (or hafnium) tetrachloride with hexafluoroacetylacetone under very stringent conditions. The compounds are useful in that they may be easily thermally decomposed to yield the respective metal dioxides as ultrahigh purity, fine particle, fiber or thin film oxides.

BACKGROUND OF THE INVENTION (1) Field of the invention

This invention is in the field of organometallic compounds containing zirconium and hafnium and in the preparation of these compounds.

(2) Description of the prior art

An important class of organic compounds known as $\beta$-diketones (or 1,3-diketones) are those containing two carbonyl groups. The keto-enol tautomeric forms of these compounds may be represented by the follownig general structures:

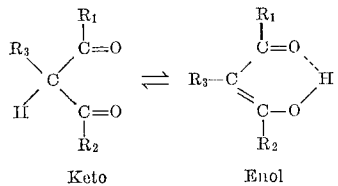

Keto     Enol where $R_1$ and $R_2$ may be alkyl, fluorinated alkyl, aromatic, heterocyclic, and many other groups. $R_3$ may be H, halogen, SCN, $NO_2$, CHO, $CH_3CO$, and many other groups. Thus a wide variety of substituents can appear at $R_1$, $R_2$, and $R_3$ with the result that numerous $\beta$-diketones of varying physical and chemical properties can be synthesized. The most familiar example of a $\beta$-diketone is acetylacetone where $R_1$ and $R_2$ are $CH_3$ groups and $R_3$ is H.

The negative ion formed by the removal of the proton from the above keto-enol structures may serve as a coordinating ligand to almost any positive ion of an element and form what is known as a complex. The organometallic compounds thus derived from the coordination of the ligand ions and the metal ions are known as metal $\beta$-diketonates or metal $\beta$-keto-enolates. Under suitable conditions cationic, neutral, and anionic metal complexes can be formed. Many of the neutral metal complexes are readily soluble in organic solvents and can be vaporized and some of them can be distilled. These unusual properties of metal $\beta$-diketonates attracted the attention of early chemists and in recent years, with the advent of gas chromatography, these compounds have been studied with ever increasing interest. Metal $\beta$-diketonates have been studied for almost one hundred years. Complexes have been reported for virtually every metallic and metalloidal element in the Periodic Table. The number of $\beta$-diketones known to form metal complexes may exceed one hundred and more $\beta$-diketones are prepared each year. Yet a great deal still remains to be understood about $\beta$-diketonates and only recently new avenues of exploration have appeared. The potential value of this class of compounds has only begun to be exploited.

The ligand ions of $\beta$-diketones may form complexes with metal ions in many ways. They may form monomeric complexes. They may form polymeric complexes. They may form mixed ligand complexes. They may form various types of isomeric complexes. The structure, stereochemistry, and stability of these $\beta$-diketonates are now being studied with refined techniques and in great detail. Recent review articles reveal the enormity of scope, character, and interest in the $\beta$-diketonates.

One important reason why metal $\beta$-diketonates are being studied with increasing interest is because of their potential applications. Apart from academic and theoretical points of view, the metal $\beta$-diketonates hold promise of useful applications in several different fields. They are useful as catalysts in polymer synthesis, as laser materials, as high density gyroflotation fluids, and as volatile sources for the deposition of metals. Metal $\beta$-diketonates may be used to obtain high purity metal oxides by thermal and hydrolytic decomposition.

The current need for better and more reliable oxide ceramics and ultrafine high purity ceramic powders of zirconia and hafnia necessitated the study of thermal decomposition of $\beta$-diketonates of zirconium and hafnium. From the points of view of greater volatility and lower temperature of thermal decomposition, zirconium tetrakis (hexafluoroacetylacetonate) and hafnium tetrakis (hexafluoroacetylacetonate) looked promising. The hafnium compound has not, to the best of the inventors' knowledge, been reported in the literature. The zirconium compound has been reported in the literature [reference: M. L. Morris, R. W. Moshier, and R. E. Sievers, Inorg. Chem. 2, 411 (1963)]. However, the details of the method of preparation and the results of the chemical analysis are not given in the reference. Judging from melting point and infrared spectrum data given in the cited reference, the compound which is called zirconium tetrakis (hexafluoroacetylacetonate) in the reference is in fact a hydrated or hydrolyzed compound and as such is of no use in the preparation of high purity zirconia.

Preparative methods for many metal $\beta$-diketonates have been described in the literature. However, none of the literature methods are suitable for the preparation of the hexafluoroacetylacetonates of this invention because hexafluoroacetylacetonates of this invention have been found, quite unexpectedly, to be moisture sensitive, i.e. these compounds undergo hydrolysis. Acetylacetonates and trifluoroacetylacetonates of zirconium and hafnium which have been thought to be very similar to the corresponding hexafluoroacetylacetonates are not moisture sensitive, i.e. they do not undergo hydrolysis. Thus, there has previously been no reason to assume this type of moisture sensitivity of the compounds of this invention.

SUMMARY OF THE INVENTION

It has now been unexpectedly found that the exercise of strict control over reaction conditions is necessary to obtain pure, anhydrous and unhydrolyzed zirconium tetrakis (hexafluoroacetylacetonate) and hafnium tetrakis (hexafluoroacetylacetonate). The compounds are prepared by the reaction between the respective metal chlorides ($ZrCl_4$ and $HfCl_4$) and hexafluoroacetylacetone $$(C_5H_2F_6O_2)$$

The reaction proceeds according to the following equation:

$$MCl_4 + 4C_5H_2F_6O_2 \rightarrow M(C_5HF_6O_2)_4 + 4HCl$$

wherein M is Zr or Hf. All operations involved in the synthesis, purification, and subsequent storage and handling of the β-diketonates of this invention must be carried out in an inert atmosphere and under anhydrous conditions in order to avoid formation of hydrated and hydrolyzed products from the compounds of this invention.

DESCRIPTION OF THE PREFERRED EMBODIMENT

The following specific examples will serve to explain the invention and make it practicable by anyone skilled in the art.

EXAMPLE I

To 2.33 grams (0.01 mole) of zirconium tetrachloride taken in a 250 ml. Erlenmeyer flask, 40 ml. of dry carbon tetrachloride and 6 ml. (0.043 mole) of hexafluoroacetylacetone were added. A reaction took place readily with a brisk evolution of hydrogen chloride. The reaction was carried out in a dry box.

After hydrogen chloride evolution slowed down the flask was removed from the dry box and attached to a water-cooled reflux condenser which had been previously flushed with dry nitrogen. The mixture was refluxed for a half-hour.

After refluxing, the mixture was transferred back to the dry box and filtered. The filtrate contained in a 100 ml. beaker was transferred to a vacuum desiccator previously flushed with dry nitrogen.

The solvent was removed from the filtrate by vacuum distillation and simultaneous cooling. A yield of 8.66 grams of white crystalline product was obtained. This yield was over 94% of theoretical.

The crystalline product was purified by vacuum sublimation at room temperature and at a pressure of 0.03–0.02 mm. The final purified product, zirconium tetrakis (hexafluoroacetylacetonate) was a colorless crystalline solid. It melted completely at 39°–42° C. to a clear, colorless liquid when heated in a closed capillary tube containing nitrogen.

*Analysis.*—Calculated for $ZrC_{20}H_4F_{24}O_8$ (percent): C, 26.13; H, 0.44; F, 49.59; Zr, 9.92. Duplicate results found (percent): C, 25.61 and 25.31; H, 0.39 and 0.35; F, 46.65 and 46.50; Zr, 10.19 and 10.24.

Analysis for chlorine showed none present in the sample.

The infrared absorption maxima for the compound in the region of 4000–400 cm.$^{-1}$ were as follows: 3262, 3146, 3078, 1644, 1623, 1567, 1541, 1439, 1362, 1257, 1214, 1157, 1138, 1108, 817, 745, 660, 592, 531, 495. Peaks which could be attributed to the presence of $H_2O$ or OH were absent. This indicated that the compound was anhydrous.

Differential thermal analysis was carried out on a 0.0611 gram sample of the zirconium tetrakis (hexafluoroacetylacetonate) in the temperature region of −50 to 400° C. under the following experimental conditions: Reference, alumina; 10–11° C. rise of temperature per minute; 1 millivolt recorder; nitrogen atmosphere. The differential thermal analysis curve obtained showed an endothermic peak at 39° C. and a shoulder at 42.5° C. in the melting point region. This suggests that the compound is dimorphic. Another endothermic peak at 231.0° C. indicated the boiling point of the compound.

Thermogravimetric analysis was carried out on the compound of this example in the temperature range of 25–500° C. under the following experimental conditions: Sample weight, 0.1 gram; 2.7–2.8° C. rise in temperature per minute; helium flow, 40 ml. per minute. The results indicated that the compound was volatile and partially decomposed at 146–147° C.

Mass spectra were taken of the zirconium compound on an Associated Electrical Industries MS–9 double focusing, high resolution mass spectrometer using ionizing energies of 10 and 70 ev. at temperatures of 130–170° C. Weak parent peaks observed in the spectra established that in the vapor phase the compound was monomeric and had a composition of $ZrC_{20}H_4F_{24}O_8$. Compared to the background, no significant increase in the intensity of OH and $H_2O$ peaks was observed. This would appear to lend excellent support to the conclusion from the infrared data that the compound was anhydrous.

Proton and fluorine nuclear magnetic resonance spectra of a concentrated solution of zirconium tetrakis (hexafluoroacetylacetonate) in carbon tetrachloride were taken. Proton spectra were taken at 37° C. on a Varian Associates Model A–60 spectrometer using tetramethylsilane as the internal standard. A single sharp proton peak at −6.56 p.p.m. (assigned to CH protons) was found. Fluorine spectra were recorded at 25° C. on a Varian Associates Model V–4300–2 dual purpose spectrometer operating at a frequency of 40.0 mc. and a field strength of approximately 9986 gauss. Trifluoroacetic acid was used as an external reference. The fluorine spectra showed two peaks at −1.96 and −1.56 p.p.m. with the peak area ratio 25:1 respectively. The single sharp major peak was due to the compound. The small minor peak probably resulted from a small amount of impurity introduced during sampling for this extremely sensitive test.

The zirconium compound was chromatographed using a Hewlett-Packard (F and M) Model 5754 gas chromatograph under the following experimental conditions: 1 ft. x ¼ in. outer diameter Teflon tubing containing 5% Apiezon L on Gas-Pack F (60–80 mesh); temperatures for injection port, column, and thermal conductivity detector, 110°, 70°, and 108° C., respectively; helium flow, 60 ml. per minute; solvent, carbon tetrachloride; sample size, 5 μl.; a millivolt recorder with attenuation, 1; chart speed, 0.5 inch per minute. Under these experimental conditions the compound, in a duplicate run, gave a single, moderately sharp peak with an average retention time of 2 minutes, 7 seconds.

Thermal decomposition of the $ZrC_{20}H_4F_{24}O_8$ was carried out in a modified Sargent Micro Combustion apparatus into which a Vycor brand glass tube 91 cm. long and 9 mm. inner diameter was inserted. Dry prepurified nitrogen was passed through the glass tube at a rate of 13 ml. per minute. A porcelain boat containing 50–70 mg. of the compound was introduced and the compound was volatilized by heating to about 100° C. by means of a heating tape wrapped around the glass tube. The vapor of the compound passed through an intermediate hot zone at 178° C. and then into a decomposition zone where a temperature of 600° C. was maintained. After 18 hours of continuous run the apparatus was allowed to cool to room temperature. The compound gave black, grey, and white deposits in that order extending over a length of about 4 cm., the black deposits appearing at the start of the decomposition zone. The black and white deposits were both identified to be monoclinic zirconium dioxide by examination of the X-ray diffraction patterns of the powdered deposits. The black color may have been caused by small amounts of amorphous carbon or by oxygen deficiency in the zirconium dioxide. The white deposit was high purity zirconium dioxide of stoichiometric composition.

The anhydrous zirconium tetrakis (hexafluoroacetylacetonate) was exposed to air. The product which resulted from the exposure was found to have significantly different properties from those of the compound which had not been exposed to atmospheric moisture. The difference in properties was evidenced by (A) the behavior on melting, (B) the chemical analysis, and (C) the infrared spectrum.

(A) With a series of samples given increasing air exposure, complete or partial melting was observed in the ranges: 39–45°, 70–85°, and 142–160° C. The higher melting points and subsequent analysis of the hydrolysis products showed that the compound reported by Morris, Moshier, and Sievers in the above-cited reference was actually a hydrolysis product which is not useful as a precursor to high purity oxide formation as is the anhydrous compound.

(B) The duplicate results of chemical analysis of a sample of air exposed zirconium tetrakis (hexafluoroacetylacetonate) were as follows: C, 2509, 24.90; H, 0.67, 0.61; F, 44.23, 43.97; Zr, 12.75, 12.51.

(C) The infrared spectrum of the air exposed zirconium compound showed new absorption peaks at 3637 and 833 cm.$^{-1}$ which may be assigned to OH stretching and Zr—O—H bending vibrations, respectively.

EXAMPLE II

The reaction between hafnium tetrachloride and hexafluoroacetylacetone may be represented by the following equation:

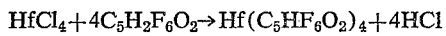

Hafnium tetrakis (hexafluoroacetylacetonate) was prepared in the manner described in Example I for zirconium tetrakis (hexafluoroacetylacetonate). The hafnium tetrakis (hexafluoroacetylacetonate) was a colorless crystalline solid. When melted in a closed capillary tube containing nitrogen, the hafnium compoun dstarted to change its appearance at 40° C. This was followed by softening and finally complete melting at 47.5–49.5° C. to a clear, colorless liquid.

*Analysis.*—Calculated for HfC$_{20}$H$_4$F$_{24}$O$_8$ (percent): C, 23.86; H, 0.40; F, 45.29; Hf, 17.43. Duplicate results found (percent): C, 23.41, 23.47; H, 0.78, 0.63; F, 44.72, 44.68; Hf, 18.47, 18.29.

Again analysis for chlorine showed none present.

Infrared spectra taken under conditions almost identical with those of Example I showed the following absorption maxima: 3270, 3150, 3085, 1646, 1623, 1569, 1542, 1444, 1363, 1261, 1211, 1158, 1138, 1110, 814, 742, 656, 593, 530, and 495. Peaks which could be attributed to the presence of H$_2$O or OH were not found. This indicated that the compound was anhydrous.

Differential thermal analysis was carried out under the conditions described above for the zirconium compound. The curve obtained from a 0.0696 gram sample showed two endothermic peaks in the melting point region at 36.5 and 44.5° C. suggesting that the hafnium compound was dimorphic. Another endothermic peak at 227.5° C. indicated the boiling point of the compound.

Thermogravimetric analysis was carried out on the hafnium compound under the conditions given above for the zirconium compound. The data indicate that the hafnium compound has the same volatility as the zirconium compound and slightly decomposes at 146–147° C.

Mass spectrometric analysis showed that the hafnium compound was monomeric under the experimental conditions (given above) and had a composition of HfC$_{20}$H$_4$F$_{24}$O$_8$ and was anhydrous.

Proton spectra carried out under conditions given above showed a single sharp peak at −6.54 p.p.m which was assigned to CH protons. Fluorine spectra (conditions of Example I) showed two peaks at −1.83 and −1.41 p.p.m. with a peak area ratio of 40:1 respectively. The single, sharp major peak was due to the hafnium compound and the very small minor peak resulted from a small amount of unidentified impurities.

Chromatography (conditions of Example I) gave a single, moderately sharp peak with an average retention time of 3 minutes, 4 seconds.

Thermal decomposition (conditions above) gave black, grey, and white deposits. The black and white deposits were both identified to be monoclinic hafnium dioxide by examination of the X-ray diffraction patterns.

Exposure to air (same manner as zirconium compound of Example I) immediately caused the hafnium tetrakis (hexafluoroacetylacetonate) to react with moisture. The reaction with moisture was exhibited by (A) a wider and higher range of melting of the resulting product; (B) the results of chemical analysis; and (C) infrared peaks in OH stretching and bending regions.

Chemical analysis duplicate results found (percent): C, 23.42, 23.18; H, 0.67, 0.71; F, 42.98, 42.99; Hf, 21.49, 21.59.

The new peaks in the infrared spectrum which indicated OH stretching vibrations were at 3676 and 3647 cm.$^{-1}$ and the new peak which indicated Hf—O—H bending vibration was at 862 cm.$^{-1}$.

GENERAL CONCLUSIONS

The total analytical results and negative reports for chloride, H$_2$O, and OH indicate that the zirconium tetrakis (hexafluoroacetylacetonate) and hafnium tetrakis (hexafluoroacetylacetonate) prepared under the conditions of Examples I and II had purities in excess of 99.9%. Controlled hydrolysis of the zirconium compound produced hydrolyzed products which were previously erroneously attributed to the anhydrous compound. Such products do not have the volatility and simple bond cleavage necessary to form high purity oxides. The anhydrous compounds of this invention can be partially decomposed at temperatures above 146–147° C. and rapidly decomposed at 500–600° C. to form ultrahigh purity submicron particles oxides, fibers, or thin film refractory oxides of hafnia and zirconia. High density and high purity massive bodies can be made from these starting product oxides.

What is claimed is:

1. Anhydrous zirconium tetrakis (hexafluoroacetylacetonate).

2. Anhydrous hafnium tetrakis (hexafluoroacetylacetonate).

References Cited

Larsen et al., J. Am. Chem. Soc., vol. 75, pp. 5107–5111 (1953).

Adams et al., J. Amer. Chem. Soc., vol. 85, pp. 3508–9 (1963).

Sievers et al., Inorg. Chem., vol. 2, No. 4 (1963), pp. 693–8.

Morris et al., Inorg. Chem., vol. 2 (1963), pp. 411–2.

TOBIAS E. LEVOW, Primary Examiner

H. M. S. SNEED, Assistant Examiner

U.S. Cl. X.R.

23—140; 74—5; 117—107.2 R; 252—301.2 R, 431 R; 260—429 J